Figure 1:
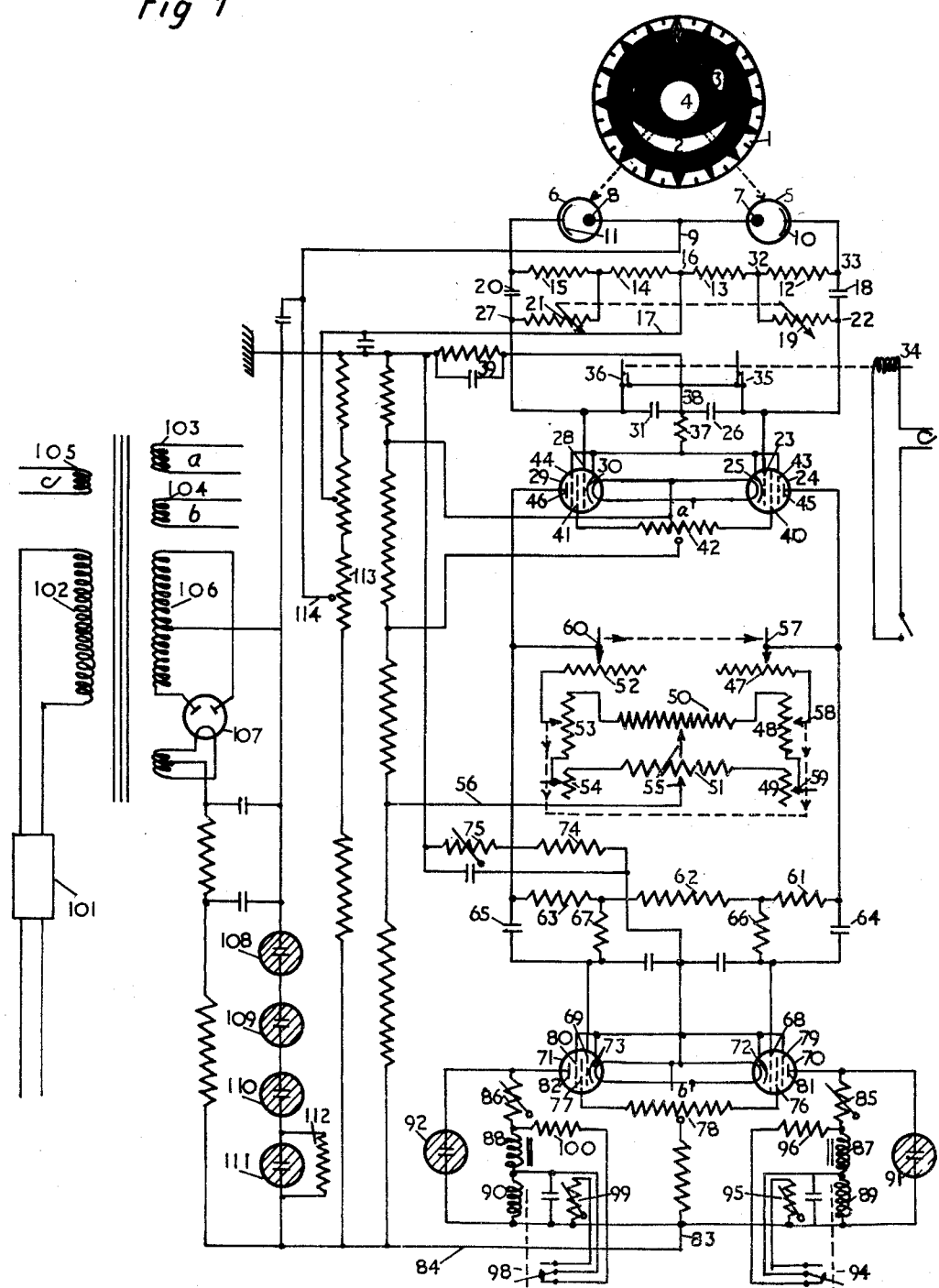

Feb. 6, 1951     K. A. NIELSEN ET AL     2,540,959
ELECTRIC STEERING EQUIPMENT FOR VESSELS OR AIRCRAFT
Filed July 17, 1947     4 Sheets-Sheet 1

Feb. 6, 1951 K. A. NIELSEN ET AL 2,540,959
ELECTRIC STEERING EQUIPMENT FOR VESSELS OR AIRCRAFT
Filed July 17, 1947 4 Sheets-Sheet 3
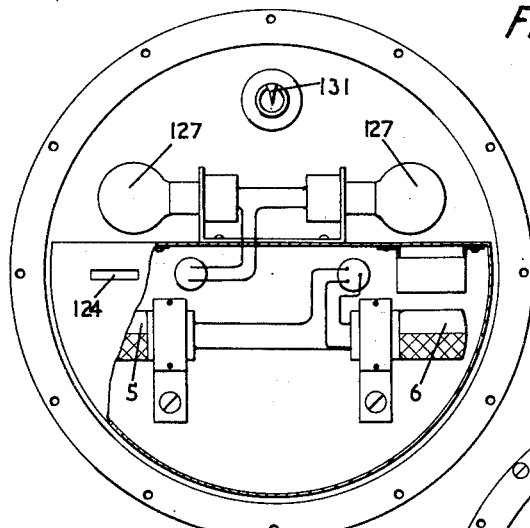
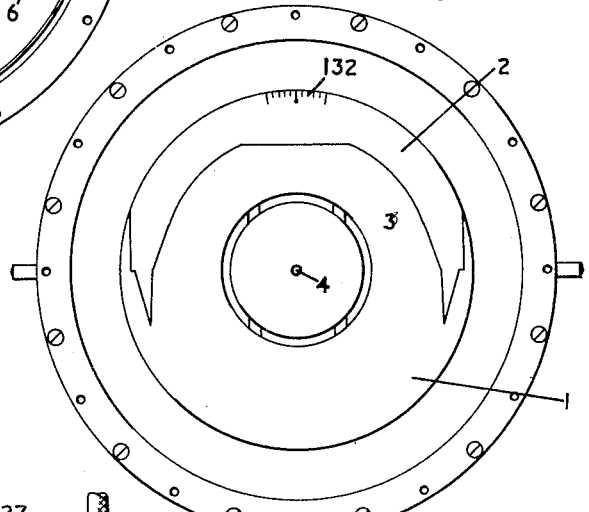
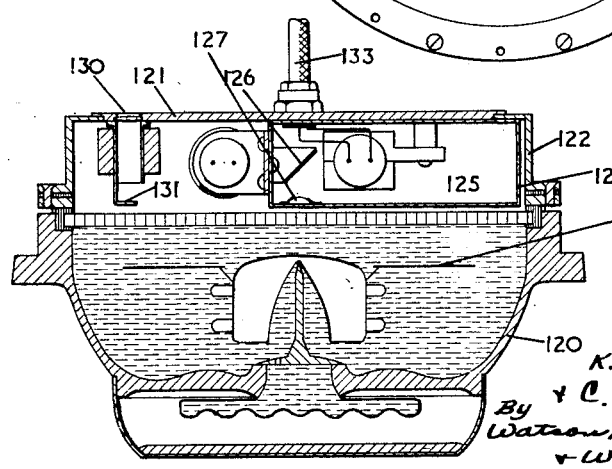

Feb. 6, 1951 K. A. NIELSEN ET AL 2,540,959
ELECTRIC STEERING EQUIPMENT FOR VESSELS OR AIRCRAFT
Filed July 17, 1947 4 Sheets-Sheet 4

Patented Feb. 6, 1951

2,540,959

UNITED STATES PATENT OFFICE 2,540,959

ELECTRIC STEERING EQUIPMENT FOR VESSELS OR AIRCRAFT

Karl Almer Nielsen, Charlottenlund, near Copenhagen, and Christen Larsen, Gentofte, near Copenhagen, Denmark Application July 17, 1947, Serial No. 761,728
In Denmark February 12, 1942

Section 1, Public Law 690, August 8, 1946
Patent expires February 12, 1962

8 Claims. (Cl. 318—489)

The present invention relates to electric steering equipment for vessels or air craft, and has for its object to provide a simple and reliable equipment that can be manufactured and mounted in a vessel or craft at low cost and is applicable to practically all types of steering gear without necessitating any considerable changes to be made in the latter, while being capable in all circumstances to afford ideal steering qualities, embracing both such advantages as are generally obtained by the performance of a skilled helmsman, and the advantages heretofore obtained by auto-steering equipment of known design.

As is well-known in auto-steering equipment it is advantageous to subject the operating means, such as electric or others motors or engines, for the steering members of a vessel or craft, in the following to be referred to as rudder, to an influence depending not only on the deviation of the vessel or craft from a desired course, but also on the time rate of such deviation. The invention, more particularly, relates to equipment embracing this feature and comprises particularly advantageous expedients for establishing the physical quantities necessary for a steering control according to this principle, and for causing such physical quantities to effect a control of the operating means for the rudder or other steering members.

With the above mentioned and other objects in view, according to one feature of the invention, an electric steering equipment for vessels or air craft comprises, in combination, operating means for said steering members, impulse generating means adapted, in response to deviations of the vessel or craft from a desired course, to generate electric impulses depending on the value of said deviation, an electric circuit arrangement comprising capacitors and resistors for establishing an electric representative of a mathematical function of said impulses and their differential coefficient with regard to time, balance means for balancing such electric representative against a physical representative of the deviation of the steering members from normal, and means for causing the direction of unbalance of said balance means to control said operating means in such a manner as to displace said steering members towards a position resulting in a state of balance of the balance means.

According to another feature of the invention, an electric steering equipment of the type specified comprises, in combination, operating means for said steering members, a compass, means associated with said compass for creating, in response to deviations of the vessel or craft from a desired course, impulses depending on the value of said deviation, an electric circuit arrangement comprising capacitors and resistors for establishing an electric representative of a mathematical function of said impulses and their differential coefficient with regard to time, an electric balance circuit for balancing such electric representative against a physical representative of the deviation of the steering member from normal, and means for causing the direction of unbalance of said balance means to control said operating means in such a manner as to displace said steering members towards a position resulting in a state of balance in the balance means.

Figure 2:
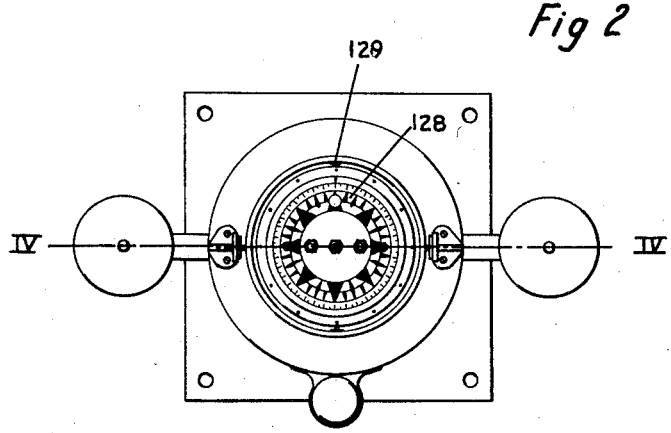
Figure 3:
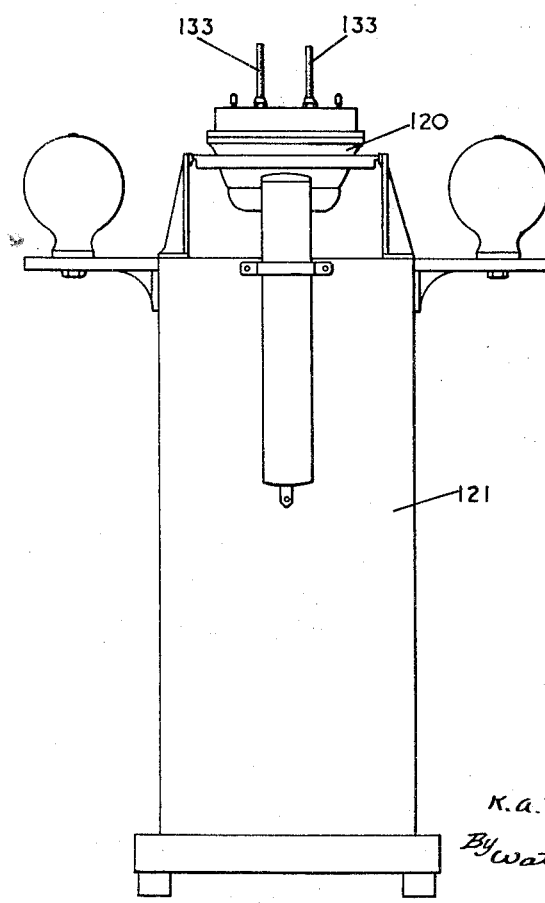
Figure 7:
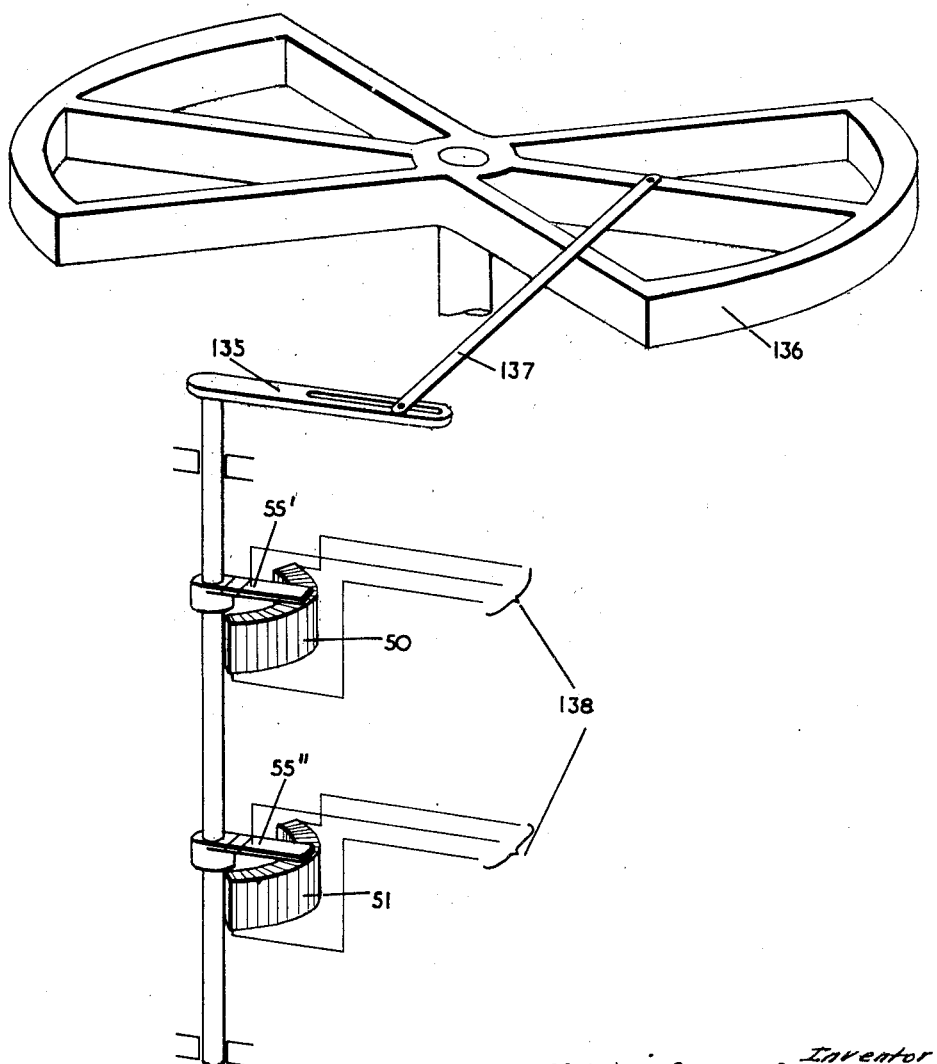

Other features and advantages of the invention will be apparent from the following detailed description of one embodiment, reference being had to the accompanying drawings in which Fig. 1 shows a diagram of one example of a steering equipment according to the invention, Fig. 2 in plan view a compass unit that may be used in an equipment of the kind shown in Fig. 1, Fig. 3 the compass unit according to Fig. 2 in side elevation, Fig. 4 in a larger scale a vertical section through the compass bowl along the line IV—IV of Fig. 1, Fig. 5 the compass bowl in plan view after removal of a cover unit, Fig. 6 the cover unit as viewed from below with certain parts broken away, and Fig. 7 a device for testing the movements of the rudder.

Referring first to Figs. 2–6 of the drawings, 120 designates a compass bowl mounted as usual in gymbals on a vertical post 121. A disc or compass card 1 provided with magnets is rotatably mounted in the compass bowl in well-known manner and has on its upper face a crescent shaped white field 2 surrounded by a blackened field 3. The field 2 is disposed substantially concentric to the axis 4 of the compass card, and its radial width is greatest in the middle and decreases towards both ends. A variation in the opposite sense, so that the width is greatest at the ends may be adopted with equal result, and it would also be possible to make the field 2 black and the field 3 white.

Mounted on the top of the compass bowl is a cover unit comprising a rim member 122 fixed to the compass bowl and a disc 121 adjustably mounted on said rim member so that it can be rotated relatively to the latter and set in any angular position relatively thereto. On its under side the disc 121 carries a box 123 containing two photo-electric cells each adapted to receive light from a transverse strip of the white field 2 of the compass card 1, such light passing through a slot 124 in the bottom wall 125 of the box 123 and being reflected by means of a mirror 126. A lens 127 may be provided adjacent to each of the slots 124. Also on the under side of the disc 121, but outside the box 123 are mounted two electric lamps 127 serving to illuminate the white field 2. On the upper side of the disc 121 there is provided a compass card design 128, serving to set the desired course with reference to an index 129 on the rim member 122. Below a view opening 130 in the disc 121 is mounted an index 131 playing before a scale 132 at the middle of the white field 1. If the vessel follows the course set by means of the disc 121, the index 129 will be in a position directly above the neutral point of the scale 132.

Cables 133 contain conductors for supplying current to the lamps 127 and for leading the currents of the photo-cells 5 and 6 to the circuits to be described in the following. Thanks to this cable connection, the said circuits may be mounted mechanically quite independent of the compass unit.

Reference will now be had to Fig. 1 in which the compass card 1 and the photo-cells 5 and 6 are again shown, though in a somewhat diagrammatical representation which, however, will easily be understood from a reference to Figs. 2–6. It will be understood that the photo-electric cells are mounted at an angular distance corresponding roughly to the distance between the two ends of the white field 2, and in practice the latter may advantageously extend through an angle of about 180°, as thereby the establishing of the correct course or a new course may be obtained, irrespective of the size of the course deviation.

When the photo-electric cells 5 and 6 are situated in a symmetrical position above the field 2, they will receive equal quantities of light, and, therefore, release equal currents. If, on the other hand, the compass card 1 rotates relatively to the photo-electric cells, the latter will receive different quantities of light and, therefore, release currents of different values. These variations of the currents of the photo-electric cells are the medium employed for effecting the steering, and it will be seen that, at a given mutual turning angle between the compass card and the photo-electric cells 5 and 6, the variations will be the greater, the more rapidly the width of the field 2 decreases towards the ends. If the width varies abruptly from a certain value to zero, i. e. if the surface portion 2 is cut off steeply at the ends, the greatest possible variation is obtained. The designing of the field 2, therefore, affords a means of adjusting the sensitivity of the automatic steering equipment within wide limits. The width of the field 2 need not vary over the whole length of the field, but the field may also have a shorter or longer intermediate portion of constant width, cf. Fig. 5.

It is advantageous to provide the photo-electric cells with screens of such a kind that each of them receives light only from a narrow radial strip of the illuminated field 2, cf. the slots 124 in Fig. 6. The quantity of light received by each photo-electric cell will then be directly proportional to the width of the illuminated field at the place in question and to the brightness of the illuminated surface.

The anodes 7 and 8 of the photo-electric cells 5 and 6 respectively are connected through a conductor 9 to a common source of anode voltage, preferably with adjustable voltage, so that the sensitivity of the photo-electric cells may thereby be regulated. This regulation has a similar effect as the above named regulation of the illumination of the field 2 and may, therefore, be used to replace, supplement or—if the illumination of the field 2 varies in an undesirable manner —compensate for the variations of the illumination of the field 2. The cathodes 10 and 11 respectively of the photo-electric cells are interconnected through a symmetric series of resistances 12, 13, 14 and 15, the central point 16 of which is connected by way of a conductor 17 to a point of the voltage source with a suitable, preferably adjustable potential.

In parallel to the resistance 12 there is coupled an impedance branch consisting of a condenser 18 and a resistance 19, and in parallel to the resistance 15 there is coupled a similar impedance branch consisting of a condenser 20 and a resistance 21. The point of connection 22 between the condenser 18 and the resistance 19 is connected to the control grid 23 of an amplifier valve 24, and between the control grid 23 of the valve 24 and the cathode 25 a coupling-off condenser 26 for disturbances is inserted. The point of connection 27 between the condenser 20 and the resistance 21 is similarly connected to the control grid 28 of an electronic valve 29, and between the control grid 28 and the cathode 30 a coupling-off condenser 31 for disturbances is inserted.

When the photo-electric cell 5 receives a certain quantity of light, it will release a corresponding current, which creates a proportional voltage across the resistances 12 and 13.

As the condenser 18 cannot conduct direct current, the point 22 will, as long as the current of the photo-electric cell 5 is constant, i. e. as long as the compass card is situated in an unchanged position, have the same potential as the point of connection 32 between the resistances 12 and 13, and this potential is applied directly to the grid 23. In the case of very slow variations of the position of the compass card, the current of the photo-electric cell 5 may as far as its coupling effect is concerned, be considered a direct current, and the point 22 and hence the control grid 23 will, therefore, assume a potential that is univocally determined by the current of the photo-electric cell 5, i. e. varies univocally in dependence on the position of the compass card 2. In ther words, the control grid 23 receive an impulse that is univocally dependent on the deviation of the ship from the predetermined course.

If, on the other hand, the compass card 2 turns comparatively swiftly, e. g. in an anticlockwise direction, the potential of the top end 33 of the resistance 12 will at first, i. e. until an equalization through the resistance 19 has taken place, propagate directly through the condenser 18 to the point 22 and hence to the control grid 23. As in the case of a rotation in the said direction the potential of the point 33 becomes greater than that of the point 32, this means that in the case of swift rotations of the compass card a greater steering impulse is applied to the control grid 23 than in the case of slow rotations of the compass card. In other words, the condenser 18 and the resistance 19 serve as a current differentiating device, so that a greater steering impulse will be released, the swifter the ship deviates from its course.

The sensitivity of the steering equipment to the velocity of occurring changes of course depends on the time constant of the circuit consisting of the condenser 18 and the resistances 19 and 12. In a ship this time constant may advantageously be of the order of several seconds, and it is advantageous to make it adjustable, the simplest way of doing which is by making the resistance 19 adjustable. The proportion between the sensitivity of the steering equipment to course deviations on one hand and the velocity of the said deviations on the other hand depends on the proportion between the resistance 13 on one hand and the sum of the resistances 12 and 13 on the other hand and may accordingly be adjusted by adjusting the said resistance. By suitably selecting the time constant and the said proportion between the resistances the system may be arranged so that the steering impulse released in the case of very swift course variations will initially be several times greater than the steering impulse released in the case of very slow course deviations and will only in the course of several seconds fall to the value corresponding to a very slow course variation of equal size.

The condenser 20 and the resistance 21 have exactly the same effect as far as the photo-electric cells 6 is concerned as have the condenser 18 and the resistance in the case of the photo-electric cell 5. The resistances 19 and 21 are preferably jointly adjustable as indicated by a dotted line.

The condensers 26 and 31 can be short-circuited by means of a relay 34 with contacts 35 and 36 for the purpose of making the automatic steering inoperative.

The electronic valves 24 and 29 are preferably of the pentode type, and their cathodes 25 and 30 are interconnected and, by way of a cathode resistance 37 common to the valves 24 and 29, connected to the point of connection 38 between the condensers 26 and 31. The point 38 in turn is connected by way of another common cathode resistance 39 to a point of the voltage source with a suitable potential preferably with the potential zero. The screen grids 40 and 41 of the valves 24 and 29 are coupled via a balance resistance 42 to a point of the voltage source with a suitable potential. In the arrangement shown the suppressor grids 43 and 44 are directly connected to the cathode 25 and 30 respectively.

The valves 24 and 29 have a common push-pull-coupled output circuit, the anodes 45 and 46 respectively of the valves being interconnected through a balance resistance composed by eight elementary resistances 47, 48, 49, 50, 51, 52, 53 and 54 respectively and having an adjustable tapping 55, which through a conductor 56 is connected to the common anode voltage source. The anode 45 is connected by way of a tapping 57 to an adjustable point of the resistance 47, one end of which is in turn connected to an adjustable tapping 58 of the resistance 48. One end of the resistance 48 is connected to one end of the resistance 50, while the other end of the resistance 48 is connected to an adjustable tapping 59 of the resistance 49. The latter in turn is at one end connected to the resistance 51. The resistances 52, 53 and 54 are in exactly similar manner coupled to the other ends of the resistances 50 and 51, and the resistance 52 is provided with an adjustable tapping 60 corresponding to the tapping 57. The tapping 55 slides along both resistances 50 and 51, and its position is determined by the steering members, i. e. in the case of a ship by the rudder. The resistances 50 and 51 may e. g. be wound in annular shape, in which case the tapping 55 is rotatably arranged relatively to the said resistances on a shaft that is mechanically coupled to the rudder, either directly or indirectly.

One way of carrying this into effect is illustrated in Fig. 7 where the tapping 55 is materialized as two wiping contacts 55′ and 55″ fixed to a shaft 134 which carries an arm 135 coupled to the rudder quadrant 136 by means of a link 137. 138 are wires leading to the circuits shown in Fig. 1, and it will be noted that the latter circuits may be mounted at any place of the vessel, mechanically independent of the rudder, as they are of the compass unit. In fact, the circuits may be built into a special unit, a so called eliminator which acts as a link between the compass unit and the rudder, though mechanically completely independent of both. Also the resistances 47 and 52 may be rotary resistances that are mounted concentrically to the resistances 50 and 51. The tappings 57 and 60 are operated by manual steering means, not shown, in such a manner that both of them are simultaneously moved upwards and downwards in the drawing, i. e. when the resistance 47 is increased, the resistance 52 is decreased and vice versa.

In parallel to the balance resistance 47—54 lies a resistance chain 61, 62 and 63, which by means of condensers 64 and 65 and resistances 66 and 67 is coupled to the control grids 68 and 69 of two subsequent amplifier valves 70 and 71 in exactly similar manner as the resistance chain 12, 13, 14, 15 is coupled to the control grids of the first amplifier valves.

The described push-pull-coupled output circuit of the two valves 24 and 29 of the first amplifier step acts as a balance circuit responsive to the balance between the controlling action of the photo-electric cells on one hand and the deviation of the rudder from the neutral position on the other hand. Suppose at first the tappings 57 and 60 are in a symmetrical position and that the tapping 55 is situated on the middle of the resistances 50 and 51, which means that the rudder is in its neutral position. Suppose further that the photo-electric cells 5 and 6 are in a symmetrical position above the field 2, or, in other words, that the ship is sailing according to the correct course. When these conditions are fulfilled, the currents of the photo-electric cells 5 and 6 will be equal, i. e. also the control voltages on the grids 23 and 28 will be equal. The balance circuit will be at balance, i. e. equal control voltages are applied to the grids 68 and 69.

Now, if the compass card 2 turns relatively to the photo-electric cells 5 and 6, e. g. in the anti-clockwise direction, the current of the photo-electric cell 5 will increase, while the current of the photo-electric cell 6 will decrease. Accordingly a greater voltage will be applied to the grid 23 than to the grid 28. The balance circuit will no longer be at balance, but will conduct a higher current in its upper half than in its lower half, and this again results in a lower potential being applied to the grid 68 than to the grid 69. As will be explained in the following, such a difference occurring between the potentials of the grids 68 and 69 will have the effect that a rudder motor or the like for moving the rudder towards re-establishment of the course is started. Now, when the rudder is turned, the tapping 55 will be displaced upwards along the resistances 51 and 50. The upper portion of the balance resistance will, therefore, become smaller than the lower portion, and this results in the potential of the grid 68 being increased and the potential of the grid 69 being decreased. When the tapping 55 has been displaced a certain distance, a voltage balance will have been re-established in the balance circuit, and the grids 68 and 69 will again have the same potential, whereby the rudder motor is stopped. Thus, to any turning of the compass card 2 will correspond a definite turning of the rudder by which balance is re-established in the balance circuit. However, in the case of swift rotations of the compass card the balance circuit, for the reasons previously mentioned, will be more disturbed than in the case of slow rotations, i. e. the rudder must at first make a greater turning movement in order to restore balance. If so, when the swift rotation of the compass card has come to an end, and the compass card has again become stationary, or at any rate turns but slowly, there will no longer be a state of balance in the balance circuit, whence the rudder must again turn somewhat backwards in order to establish balance.

If it is now supposed that for some reason both photo-electric cells 5 and 6 become more intensively illuminated, e. g. because the power of the light source illuminating the surface 2 varies, or because the compass card inclines relatively to the photo-electric cells, both valves 24 and 29 will have a tendency to draw greater anode currents. Both these anode currents must pass through the cathode resistances 37 and 39, thereby reducing the control grid potential of the valves 24 and 29 relatively to the cathodes, which again reacts towards reducing the anode currents. The cathode resistances are thus selected that the sum of the anode currents of the valves 24 and 29 cannot vary much, e. g. not more than 15%, when the sum of the quantities of light varies from a certain value to twice as much. This means that the anode current and hence the potentials of the grids 68 and 69 relatively to the cathodes cannot simultaneously rise to a substantial degree in the same direction, whereas there is nothing to prevent their varying to a substantial degree in opposite directions.

In the case of manual steering, the effect of the photo-electric cells on the grids 23 and 24 is switched off by means of the contacts 35 and 36, i. e. the control grids 23 and 24 have equal grid potential, which is determined by the cathode resistance 37. Accordingly the anode currents of the valves 24 and 29 are equal, and if the tappings 57 and 60 are situated in the symmetric position and the tapping 55 in the central position, balance will, therefore, exist in the balance circuit, and the grids 68 and 69 will have equal potentials of a value exactly low enough to ensure that the rudder motor is not switched on.

Now if the tappings 57 and 60 are both displaced in a downward direction, this will result in the equal anode currents creating a greater voltage drop in the upper half of the coupling resistance than in its lower half. Accordingly the potential of the grid 68 decreases, while the potential of the grid 69 increases. The rudder motor is accordingly started and slides the tapping 55 upwards, whereby the upper half of the balance resistance decreases, and the lower half of the balance resistance increases, until the two halves have again the same voltage drop, so that voltage balance has been re-established.

The cathodes 72 and 73 of the valves 70 and 71 are connected by way of a common cathode resistance comprising a constant part 74 and a variable part 75 to a point of the voltage source with suitable potential. Their screen grids 76 and 77 are connected by way of a balance resistance 78 to a point of the voltage source with a suitable potential, and their suppressor grids 79 and 80 are connected directly to the cathodes 72 and 73 respectively. In the output circuit of each of the valves 70 and 71, between the anodes 81 and 82 respectively and a point 83, connected via a conductor 84 to the anode voltage source, lie in series an adjustable resistance 85 and 86 respectively, an inductance (ignition coil) 87 and 88 respectively, and a magnetic relay 89 and 90 respectively. In parallel to the variable resistance, the inductance and the relay are coupled a discharge tube 91 and 92 respectively of the glow-lamp type.

The relay 89 has two contacts 93 and 94, of which the contact 93 in a manner not indicated in detail serves for reversing the rudder motor, while the contact 94 serves partly to switch on a preferably adjustable shunt resistance 95 in parallel to the relay 89, partly to switch off a short circuit lying across the ignition coil 87, and if desired including a resistance 96.

In exactly similar manner, the relay 90 is provided with two contacts 97 and 98 and an adjustable shunt 99 for the relay coil, and a short circuit for the ignition coil 88, if desired including a resistance 100.

Let it be assumed that the potential of the grid 68 increases as a result of the influence of the balance circuit, corresponding to a clock-wise rotation of the compass card, while the potential of the grid 69 decreases. Thereby the anode current in the valve 70 increases, and when it has reached a certain value, the relay 89 attracts its armature, so that the contacts 93 and 94 are operated. The rudder motor is now switched on and commences to turn the rudder in a direction towards a re-establishment of the predetermined course. At the same time the shunt 95 is switched on in parallel to the resistance 89, so that the latter is now ready to drop its armature upon a very small decrease of the current from the value at which the relay attracted its armature. If the shunt were not provided, there would be a rather great difference between the current values, at which the relay attracts and drops its armature respectively. On the other hand, as the shunt 95 is adjustable it is possible thereby to adjust the current values at which the relay attracts and drops its armature, and thereby in fact, the time lag with which the relay works. In some cases it may be advantageous to introduce a certain time lag into the operation of the whole equipment, and perhaps even to overrule the anticipatory effect of the second differentiating stage, and this may be done by suitably adjusting the shunt resistance 95 and the corresponding shunt resistance 99.

Moreover the operation of the contact 94 results in the ignition coil 87 being suitably switched on in series with the relays 89. By this sudden switching of a relatively great inductance, a relatively high voltage is created across the said inductance, and the value of the latter is thus adjusted so that the total voltage across the resistance 85, the ignition coil 87 and the relay coil 89 is sure to increase above the ignition voltage of the glow-lamp 91. When the glow-lamp 91 has been ignited, it ensures that the total voltage drop across the resistance 85, the ignition coil 87 and the relay 89 does not exceed a certain value, and it thereby protects the relay 89 against over-magnetizing, so that it always maintains the same armature attracting and dropping current value. The purpose of the ignition coil 87 is exclusively to make sure the ignition of the lamp 91 in spite of the fact that the latter has an ignition voltage lying considerably above the operating voltage which it assumes as soon as it has been ignited.

When balance has been re-established in the balance circuit, the potential of the control grid 68 and hence the current through the relay 89 fall to such a value that the relay, thanks to the shunt 94, drops its armature, so that the effected reversing of the motor is stopped, the shunting of the relay ceases, and the ignition coil 87 is short-circuited.

The ship is now gradually restored to its proper course, and when it has turned through a certain angle (the clearance), the influence of the photo cells on the balance circuit will decrease under the influence of the return movement of the compass card as well as of the velocity at which the said movement takes place, while the influence of the tapping 55 on the balance circuit is unchanged, whence non-balance will now occur in the opposite sense, so that the voltage of the grid 69 increases while the voltage of the grid 68 decreases. Accordingly exactly the same process will take place in the output circuit of the valve 71 as formerly occurred in the output circuit of the valve 70, and the relay contact 97 causes a rotation of the rudder motor in the opposite sense.

As mentioned, provision is made in the first amplifier step for such a balancing of the steering impulses that the steering impulses applied to the second amplifier step cannot simultaneously increase to a substantial degree. In the second amplifier step a further balancing in the same direction is brought about by means of the cathode resistance 74, 75. The latter is arranged in such a manner, that the anode circuit of the valves 70 and 71 and hence the relays 89 and 90 cannot both of them simultaneously conduct so great currents that the relays will attract their armatures.

For further security against coupling errors in this respect, even in the case of defects in the amplifier, the contacts 93 and 97 may be mechanically interconnected.

The suppression of variations in the sum of the anode currents taking place in the second amplifier step may be even greater than the suppression in the first amplifier step, e. g. so great that an increase of the sum of the grid voltages to the double value results in an increase of the sum of the anode currents of but 2%. The suppressions in the first and second amplifier step respectively supplement one another, so that in the occurrence of an increase of the total quantity of light to both photoelectric cells only a very small variation will be left in the sum of the anode currents in the output step, thus in the case of the supposed figures only about 3% at a 100% increase of the quantity of light.

By adjusting the resistance 75 the play or clearance of the apparatus may be adjusted, i. e. the angle through which the ship must turn out of the predetermined course or through which the manual steering means must be turned before an operation of the rudder motor takes place.

As mentioned, the second amplifier step is coupled anticipatively to the balance circuit by means of the condensers 64 and 65 and the resistance 66 and 77, i. e. the second amplifier step corresponds not only to changes of the balance in the balance circuit, but also to the velocity of these changes. This may be employed for compensating for the delay in the balance of the balance circuit caused by the inertia of the rudder motor, play in the rudder etc.

As will appear from the above description, the steering equipment comprises a great number of possibilities of being adjusted according to the needs in each individual case, i. e. according to the properties of the ship, its loading, the weather and wind conditions etc. Thus, the light sensitivity of the photo-electric cells may be adjusted by adjusting their anode voltage, and their sensitivity to rotations by shaping the field 2 or by varying its illumination. The anticipating effect of the steering may be adjusted by means of the resistances 19 and 24, and, if desired, also by adjusting e. g. the resistances 66 and 67, which of course also may be arranged to be variable.

The sensitivity of the rudder may be adjusted by varying the resistances 48, 49, 53 and 54. Hereby the characteristic of the influence of the rudder on the balance circuit may at the same time be varied, seeing that the resistance 50 has a greater value than the resistance 51.

Finally the play of the apparatus may be controlled by adjusting the resistance 75, and the armature attracting and dropping limits of the relays 89 and 90 may be controlled by adjusting the series resistances 85, 86, and the shunt resistances 95 and 99 respectively.

In the embodiment shown, a buzzer 101 is employed as a source of current for operating the steering equipment and this buzzer is driven from a direct voltage source and has its alternating current side coupled to the primary winding 102 of a transformer having a number of secondary windings 104 and 105 for creating heating currents, and besides a secondary winding 106 coupled to a double rectifier valve 107 in well known manner. For stabilizing the direct current thus created a number of stabilizing tubes 108 and 109, 110 and 111 are provided, which are coupled in between the positive and the negative terminals, and one of which is coupled in parallel to a resistance 112. Between the positive and the negative terminals on the direct current side a number of voltage divider chains are arranged in well known manner, from which chains the necessary operating voltages are tapped. One of these voltage divider chains comprises a resistance 113 with an adjustable tapping 114 to which the conductor 9 is connected, so that by displacing the tapping 114 the anode voltage of the photo-electric cells may be varied.

Having now particularly described and ascertained the nature of our invention and in what manner the same is to be performed we declare that what we claim is:

1. Electric steering equipment for vessels or craft having a rudder, comprising, in combination, control means for said rudder, a compass having means associated therewith for producing primary electric control signals in response to deviations of the craft from a desired course, a rate taking circuit arrangement including capacitors and resistors coupled to said signal producing means to produce secondary control signals representing a mathematical function of said primary control signals and their differential coefficient with regard to time, and an electric balance circuit coupled to said rate taking circuit arrangement so as to be controlled by the said secondary control signals and including an impedance element adjustable in response to the turning angle of said rudder, the said balance circuit having its output end coupled to said control means for the rudder, whereby said control means is caused to control the movement of said rudder in response to the differential action of said secondary control signals, on one hand, and the turning angle of the rudder on the other hand, the balance between these two actions being checked in the balance circuit.

2. Electric steering equipment as in claim 1 and further comprising means for manually adjusting said impedance element.

3. Electric steering equipment for vessels or craft having a rudder, comprising, in combination, control means for said rudder, a compass having means associated therewith for producing primary electric signals in response to deviations of the craft from a desired course, a rate taking circuit arrangement including capacitors and resistors coupled to said signal producing means to produce secondary control signals representing a mathematical function of said primary control signals and their differential coefficient with regard to time, and an electric balance circuit coupled to said rate taking circuit arrangement to have the current flowing therein controlled by said secondary control signals, the said balance circuit including a balance resistance adjustable in response to the turning angle of the said rudder and having terminals thereof coupled forward to said control means for the rudder to control same in response to voltages across portions of said balance resistance, whereby the rudder is controlled for movement in one direction and the other by the differential action of said secondary control signals, on one hand, and the changes of said impedance in response to the turning angle of the rudder, on the other hand, the balance between these two actions being checked in the balance circuit.

4. Electric steering equipment as in claim 3 and further comprising means for manually adjusting said balance resistance.

5. Electric steering equipment as in claim 1 and further comprising a rate taking condensor-resistor arrangement in the coupling channel between said balance circuit and said control means for the rudder.

6. Electric steering equipment for vessels or craft having a rudder, comprising, in combination, a compass having means associated therewith for producing a pair of differentially active primary electric control signals in response to deviations of the craft from a desired course, a multi-stage push-pull amplifier coupled to said signal producing means and including in successive stages thereof, first, rate-taking condenser-resistance coupling components to introduce an additional control of subsequent stages in response to the time rate of said primary control signals, and, second, a balance circuit forming the anode circuit of one stage of said amplifier and including a coupling impedance to a succeeding stage having a cathode connection adjustable in response to the turning angle of the rudder, and control means for the rudder coupled to the output terminals of said amplifier.

7. Electric steering equipment as in claim 6 and in which two push-pull coupled valves in a stage of said amplifier have a common cathode resistance which is so adjusted that the sum of the anode currents of the valves will increase at a substantially lower rate than the sum of the control grid potentials thereof.

8. Electric steering equipment for vessels or craft having a rudder, comprising, in combination, control means for said rudder, a compass including a substantially flat compass card having an illuminated surface portion of varying light emitting capacity per longitudinal unit in the circumferential direction of the compass card and photo-electric means mounted to receive light from radial strips of said surface portion to produce primary electric control signals in response to deviations of the craft from a desired course, a rate taking circuit arrangement including capacitors and resistors coupled to said photo-electric cells to produce secondary control signals representing a mathematical function of said primary control signals and their differential coefficient with regard to time, and an electric balance circuit coupled to said rate taking circuit arrangement so as to be controlled by the said secondary control signals and including an impedance element adjustable in response to the turning angle of said rudder, the said balance circuit having its output end coupled to said control means for the rudder, whereby said control means is caused to control the movement of said rudder in response to the differential action of said secondary control signals, on one hand, and the turning angle of the rudder on the other hand, the balance between these two actions being checked in the balance circuit.

KARL ALMER NIELSEN.
CHRISTEN LARSEN.

REFERENCES CITED

The following references are of record in the file of this patent:

UNITED STATES PATENTS

| Number | Name | Date |
|---|---|---|
| 1,585,210 | Roux | May 18, 1926 |
| 1,885,098 | Hill | Oct. 25, 1932 |
| 2,132,677 | Chance | Oct. 11, 1938 |
| 2,415,430 | Frische et al. | Oct. 11, 1947 |
| 2,415,819 | Halpert et al. | Feb. 18, 1947 |